United States Patent Office 3,436,458
Patented Apr. 1, 1969

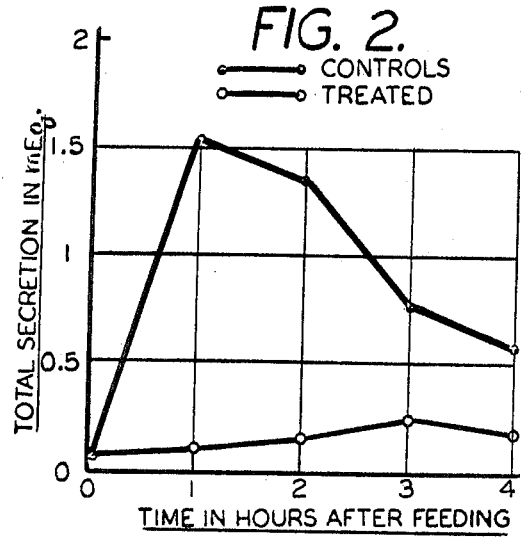
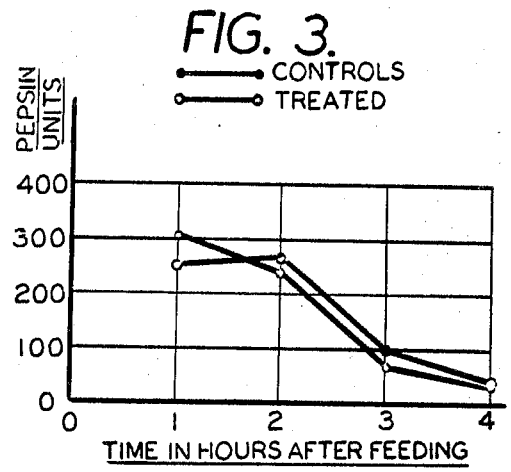
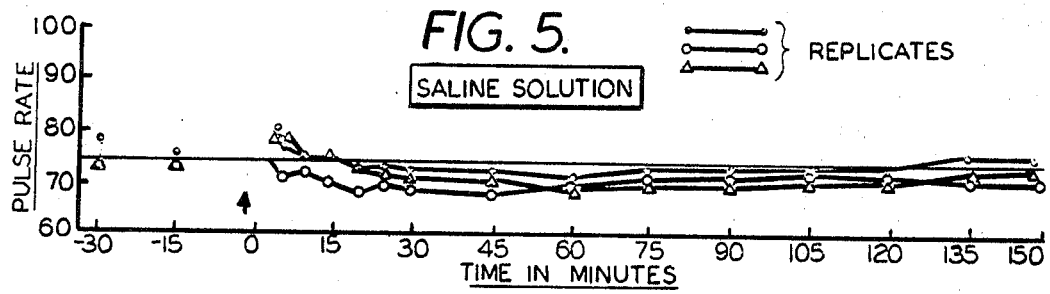
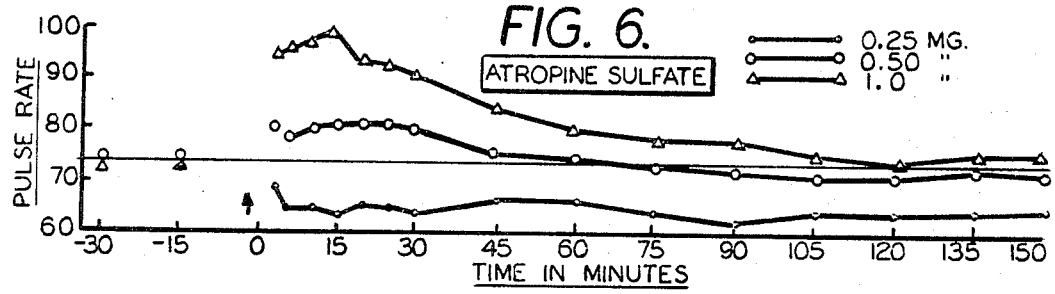
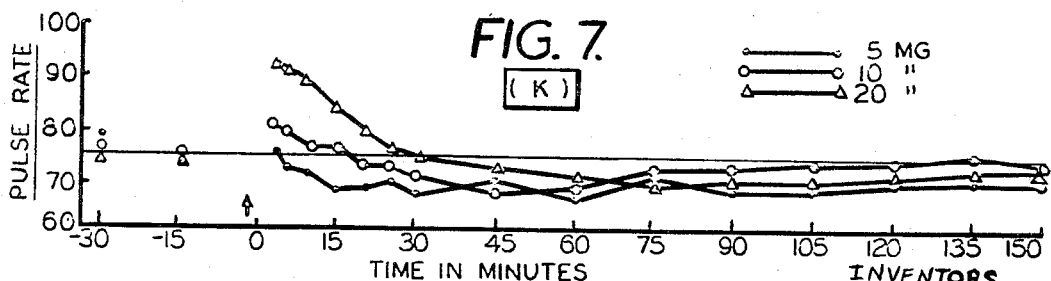

3,436,458
ANTISPASMODIC AND GASTRIC ANTISECRETORY COMPOSITIONS CONTAINING p-PHENYLPHENACYL DERIVATIVES OF l-HYOSCYAMINE AND d,l-TROPYLATROPINE
Uberto Teotino and Davide Della Bella, Milan, Italy, assignors to Whitefin Holding S.A., Lugano, Switzerland
Original application Aug. 17, 1966, Ser. No. 572,983, now Patent No. 3,356,682, dated Dec. 5, 1967. Divided and this application Sept. 21, 1967, Ser. No. 669,659
Int. Cl. A61k 27/00
U.S. Cl. 424—265
7 Claims

ABSTRACT OF THE DISCLOSURE

Therapeutic compositions comprising new p-phenylphenacyl derivatives of l-hyoscyamine and d,l-tropylatropine having the formula:

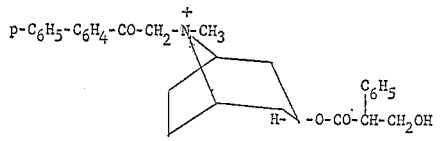

wherein X is a halogen, and a pharmaceutical carrier provide antispasmodic and gastric antisecretory compositions having the same order of activity as atropine, but without its undesirable side effects.

CROSS-REFERENCE TO RELATED APPLICATIONS

This application is a division of copending application Ser. No. 572,983, now U.S. Patent 3,356,682 issued Dec. 5, 1967, which is, in turn, a continuation-in-part of application Ser. No. 406,893, filed on Oct. 27, 1964, now abandoned.

BACKGROUND OF THE INVENTION

Field of the invention

This invention relates to therapeutic compositions comprising new tropyl tropate derivatives possessing valuable therapeutic properties.

Description of the prior art

It is known that atropine is a classical powerful antispasmodic and possesses gastric antisecretory activity. However, its great toxicity and undesirable systemic side effects severely limit its therapeutic applications.

Up to this time, several permutations of the molecular structure of atropine have been carried out in order to prepare a drug endowed with the same degree of antispasmodic and gastric antisecretory activity as atropine but at the same time devoid of its known side effects such as dryness of the mouth, retention of urine, diminution or cessation of perspiration, reduction of other body secretions, dilation of pupils and disturbance of heart rhythm. Although some useful synthetic compounds have resulted from this research, there is wide recognition that such a drug has not yet been found (A. Burger, Medicinal Chemistry, page 463, Interscience Publishers Inc., N.Y., 1960).

SUMMARY OF THE INVENTION

We have now found a number of tropyl tropate derivatives which possess a strong antispastic action and gastric antisecretory activity but no undesirable effects, even when administered in doses up to 5–6 times those clinically useful.

The compositions of the present invention comprise these new compounds, which may be represented by the following structural formula:

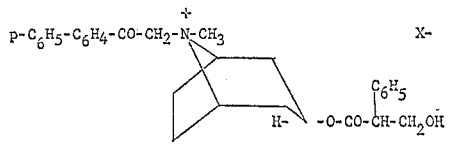

wherein X is halogen, and a pharmaceutical carrier.

DESCRIPTION OF THE PREFERRED EMBODIMENTS

It will be apparent to those skilled in the art that, referring only to the stereo-isomeric forms of tropic acid, the tropyl tropate used as starting material in preparing the above compounds, as well as the quaternary ammonium compounds of the foregoing structural formula obtained as products therefrom, can exist in three stereoisomeric forms.

The present invention is concerned with the derivatives of all three stereo-isomeric forms, namely d,l-tropyl tropat (atropine), l-tropyl tropate (l-hyoscyamine) and d-tropyl tropate (d-hyoscyamine).

Among the tropyl tropate derivatives of this invention, p-phenylphenacyl-l-hyoscyaminium bromide is prefered in view of its strong and long-lasting antispasmodic and gastric antisecretory properties.

Its pharmacological and clinical features may be summarized as follows:

(a) Its parasympatholytic activity is mainly exerted at the level of peripheral ganglionic synapses on which the compound is three times as active as hexamethonium and ten times as active as tetraethylammonium. On the other hand, it is about twenty times less effective than hexamethonium on ortho-sympathetic ganglionic synapses.

Since atropine, by contrast, acts with equal potency both at the level of peripheral ganglionic synapses and on orthosympathetic ganglionic synapses, it is immediately evident from these tests how more selective is the action of the newly discovered compounds of this invention.

(b) It counteracts effectively both motor and secretory activity of the gastrointestinal tract elicited by either peripheral stimulation of the vagus nerve or administration of acetyl-β-methyl chloline. (Salivary secretion and pupillary muscles are only slightly affected.)

In order to more clearly show this most important property of the claimed products, we report hereinafter some of the many pharmacological tests performed to this effect with p-phenylphenacyl-l-hyoscyaminium bromide, which compound, for the sake of simplicity, will hereinafter be represented by the symbol, (K).

The qualitative and quantitative changes induced by the compound (K) on gastric secretion may be deduced from the following Table 1.

where the antagonistic activity exerted by the product (K) towards different spasmogenic agents on "in vitro" iso-

TABLE 1

| Time (hr.): | Volume of gastric juice (ml.) controls treated | | Total acidity (HCl) | | | | Total peptic power (PU) controls treated | |
|---|---|---|---|---|---|---|---|---|
| | | | m. eq./ ml. controls treated | | Total m. eq. controls treated | | | |
| 0 | 0.9 | 1.2 | 0.061 | 0.056 | 0.054 | 0.067 | | |
| 1 | 12.9 | 1.7 | 0.122 | 0.066 | 1.57 | 0.11 | 302 | 266 |
| 2 | 10.7 | 2.8 | 0.130 | 0.063 | 1.39 | 0.17 | 248 | 252 |
| 3 | 7.6 | 3.4 | 0.102 | 0.077 | 0.78 | 0.26 | 72 | 95 |
| 4 | 6.5 | 2.2 | 0.100 | 0.086 | 0.65 | 0.18 | 47 | 39 |

The data of Table 1 are the mean of 3 values for controls, and the mean of two values for experiments on the treated animal. The experiments were carried out on a male dog, weighing 23 kg., which four months before, had been provided by surgical operation with a Pavlov pouch.

Gastric juice was collected every hour during four hours following a standard meal (200 gr. meal meat). For every sample of gastric juice total volume, HCl and peptic power (egg-alubumin test) were determined. (K) was injected I.M. at a standard dose of 20 mg. (50% glycol solution), 10 min. before meal.

It is of particular importance to note that in the experimental conditions and at the above dose, (K) was found to elicit a marked inhibition on volume of gastric juice, as well as on HCl secretion, while secretion of pepsin was practically unaffected.

The above and other experimental results are graphically presented in the attached drawings wherein:

FIGURE 2 is a graph similar to FIGURE 1 but showing the effect of (K) on the total HCl secretion of the dog;

FIGURE 3 is a graph similar to FIGURE 1 but showing the total peptic power, expressed in pepsin units, in the gastric juice collected after the meat meal from a dog treated with (K) as compared with an untreated dog (control);

FIGURES 5-7 are graphs of pulse rate at time intervals before and after the injection of saline solution, atropine sulfate and (K), respectively, the doses of atropine sulfate and of (K) being varied, equivalent symbols being used for doses of equivalent primary effect.

The very good spasmolytic activity of the products of the invention may be evaluated from the following table lated organs is expressed as percent inhibition of the spasm.

TABLE 2

| Isolated organ | Species | Stimulating agent | Concentration | (K) Concentr. | (K) Percent inhibit |
|---|---|---|---|---|---|
| Ileum | Guinea pig | Acetylcholine chloride | $1\times10^{-8}$ | $1\times10^{-7}$ | 95 |
| | | Tetramethylammonium iodide | $5\times10^{-6}$ | $1\times10^{-7}$ | 85 |
| | | Nicotine tartrate | $2.5\times10^{-6}$ | $5\times10^{-7}$ | 50 |
| | | 5-hydroxytryptamine | $1\times10^{-7}$ | $1\times10^{-7}$ | 90 |
| | | Bradykinin | $2.5\times10^{-8}$ | $2.5\times10^{-7}$ / $5\times10^{-7}$ | 60 / 90 |
| Duodenum | Rabbit | Spontaneous activity | | $1\times10^{-7}$ | (¹) |
| | | Acetylcholine chloride | $5\times10^{-8}$ | $1\times10^{-7}$ | 85 |
| Vagus n. stomach | Rat | Electrical stimulation | | $1\times10^{-7}$ / $5\times10^{-7}$ | 30 / 95 |
| Uterus | Rat | Spontaneous activity (estrus phase) | | $2.5\times10^{-7}$ / $5\times10^{-7}$ | 30 / 95 |
| | | Acetylcholine chloride | $1\times10^{-8}$ | $2.5\times10^{-7}$ | 80 |

¹ Tone reduction.

These results have been confirmed in clinical tests, wherein, on 27 patients affected by colicky pains due to different causes, treated by intravenous injections with 10 mg. of product (K) under "single-blind" observation (that is with only the investigator aware of the product injected, while it was unknown to the patient) 24 patients experienced very good or good relief from the pain. In another set of tests performed under "double-blind" observation (that is with both the investigator and the patient unaware of the identity of the injected product), of 23 patients treated intravenously with 10 mg. of product (K) 19 experienced very good relief from the pain.

(c) Blood pressure, cardiac rhythm and ECG (electrocardiographic) tracing appeared unaltered in both cat and dog following administration of doses of the derivative up to twenty to forty times the minimum effective dose.

Figure 4:
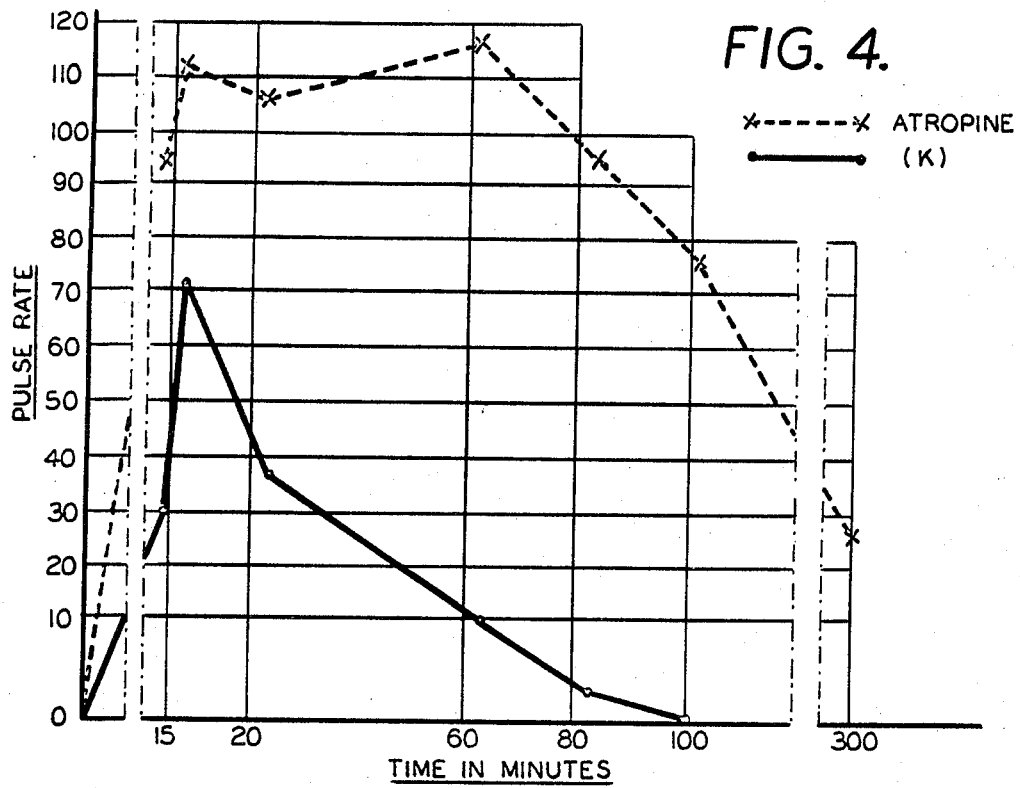
FIGURE 4 is a graph comparing the heart frequency of a 21 kg. male dog, as determined by electrocardiograph (ECG), when injected with compound (K) as compared with the use of atropine.
Figure 1:
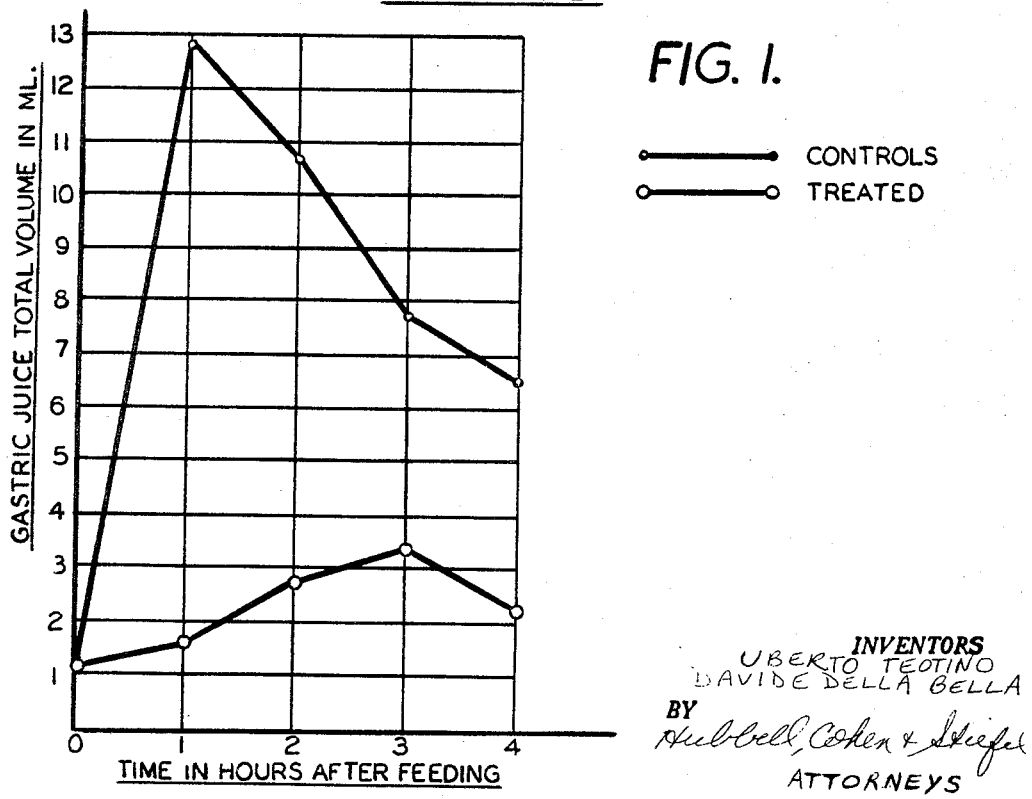
FIGURE 1 is a graph showing the effect of (K) on the volume of gastric juice from the Pavlov pouch in a conscious dog after a meat meal as a function of time in hours after the meal.

In order to show how surprisingly lower the side effects of the compounds of the invention, and in particular of the product (K), are as compared to those of atropine, we have reported in FIGURE 4 the heart frequency as recorded by ECG of a male dog, weighing 21 kg., injected one time with atropine and the other with product (K). The drugs were injected through a needle, inserted into the saphenous vein about one hour before administration and connected by a polythene tube to a syringe. The drugs were used at the following doses:

G./kg.
Atropine sulfate _____ 100
Product (K) _____ 100

It is evident how intense and long lasting is the tachycardia caused by atropine, while the effect caused by the product (K), besides being very weak, is promptly reversible.

(d) Parasympatholytic activity of the derivative, investigated by recording bradycardia and blood pressure fall induced by stimulation of the peripheral end of the sectioned right vagus in both cat and dog, proved to be very long-lasting: 4 to 5 hours following 50 mg./kg. doses intravenously. In other animal species such as rodents, both intensity and duration of action appeared to be less significant.

Results in man were comparable to those obtained in cat and dog: 10–12 mg. intravenous doses, 5 to 6 times as high as those which were effectively antispasmodic and gastrically antisecretory, did not cause xerostomia, mydriasis or heart rhythm disturbance.

This is, for example, demonstrated by the pulse rate (cardic accelerating activity), measured by palpation of the left radial artery, reported in FIGURES 5–7. While atropine sulfate induces remarkable alterations of the pulse rate, product (K) practically does not affect the normal rate. The experiments were performed on groups of 9 subjects. The values reported in the figures are the mean pulse rate as measured on groups of 9 patients in 12 experiments. The time "0" corresponds to the moment the saline solution or the drug is injected, while the negative times indicate tests performed before any treatment of the patient in order to state a comparison basis, and the base line in each graph represents the means of all pretreatment values.

The doses of atropine sulfate and of product (K) injected are not equal in absolute amount, but have been calculated on the basis of being equivalent in that they cause the same primary effect.

Also, for the absence of xerostomia induced by the drugs of the invention, the following tests (some of the many clinical tests performed to this end) are indicative of the difference existing between atropine, which causes a remarkable diminution of salivary secretion, and the product (K) of the invention, which at the therapeutic doses not only does not cause xerostomia, but on the contrary, seems to slightly favor salivary secretion.

The salivary secretion has been estimated with a method similar to that used by Brownlee et al. (Clin. Pharm. & Ther. 6, 177, 1965). The results are reported in Table 3.

TABLE 3.—SALIVARY SECRETION IN ML BEFORE AND AT THREE TIME INTERVALS AFTER I.V. TREATMENT OF THE 9 TEST SUBJECTS

Times at which salivary secretion tests were performed:
 Before: Min. −30, −15.
 After: Min. 5, 10, 15, 20, 25, 30 (1st interval).
 After: Min. 45, 60, 75, 90 (2nd interval).
 After: Min. 105, 120, 135, 150 (3rd interval).

| Treatments and Doses | Before (Basal Values) Grand means of the means of 2 tests per subject | After-Treatment Grand means of the differences from the basal values | | |
|---|---|---|---|---|
| | | 1st interval: 30 min. (6 tests per subject) | 2nd interval: 1 hr. (4 tests per subject) | 3rd interval: 1 hr. (4 tests per subject) |
| Saline Solution (3 replicates) | 1.0±0.2 | −0.4 | −0.3 | −0.2 |
| | 1.2±0.3 | −0.4 | −0.3 | −0.2 |
| | 1.3±0.2 | −0.3 | 0 | −0.1 |
| Atropine, 0.25 mg | 1.2±0.3 | −0.5 | −0.3 | −0.3 |
| Sulfate, 0.5 mg | 1.2±0.2 | −0.8 | −0.5 | −0.1 |
| 1 mg | 1.5±0.2 | −1.2 | −1.0 | −0.8 |
| (K) -- 5 mg | 0.9±0.2 | +0.1 | 0 | +0.2 |
| 10 mg | 0.9±0.2 | +0.2 | +0.1 | 0 |
| 20 mg | 1.3±0.4 | −0.2 | −0.2 | −0.3 |

From the above reported data it is evident that product (K) up to 10 mg. intravenous doses (which are at the maximum level of the therapeutic doses) does not possess atropine-like properties to any significant extent.

In summary, the products of the invention, and in particular p-phenylphenacy-hyoscyaminium bromide (product K), are characterized by a very high (and in our experience unique) ratio of inhibitory activity on the muscarinic receptor and the orthosympathetic ganglia and thus prove to have very good antispastic and antisecretory effects while being practically completely free of "atropine-like" side effects at the therapeutic doses.

(e) Toxicological data of this compound are as follows: $LD_{50}$ intravenously is 10 mg./kg. in cat (400 times the minimal effective dose), 12.1 mg./kg. in mouse and 11.6 mg./kg. in rat. In the case of the subcutaneous and oral route, $LD_{50}$ in mouse appeared to be higher than 400 mg./kg. Death seems to be due to respiratory muscle paralysis; heart activity is the last that disappears.

A first method for producing the new compounds of this invention comprises reacting a p-phenylphenacyl halide of the formula:

wherein X is a halogen, with a tropyl tropate in the presence of an inert solvent at a temperature in the range of from about 0° C. to 60° C.

In accordance with a second method, the compounds of the present invention may be prepared by reacting the tropine with a p-phenylphenacyl halide, condensing the product thus obtained with an O-acyl-tropic-acid halide and deacylating the resulting compound.

The compounds of the present invention and the processes for preparing them are illustrated by the following examples.

Example I 1.14 g. (0.004 mole) of p-phenylphenacyl bromide were dissolved by heating to about 45° C. in 15 cc. of anhydrous acetone. To this solution was added, with stirring, a solution of 1.19 g. (0.004 mole) of dl-tropyl tropate in 16 cc. of anhydrous acetone; the heating and stirring were continued for about six hours.

After standing overnight in the refrigerator, the precipitate; p-phenylphenacyl-dl-tropyltropinium bromide, was collected by filtration and dried in vacuo at 50° C. Yield: 2 g.; M.P.=190°–192° C.

Example II 5.50 g. (0.02 mole) of p-phenylphenacyl bromide were dissolved in 56 cc. of anhydrous acetone previously heated to about 40° C. This solution was added, with stirring, to a solution of 5.70 g. (0.02 mole) of 1-hyoscyamine in 43 cc. of anhydrous acetone; the reaction solution was maintained at 45° C. and stirred for about six hours.

After standing overnight in the refrigerator, the precipitate was collected by filtration and dried in vacuo at 60° C. Yield: 10.2 g.; M.P.=193–194° C. The specific rotation determined in a solution of DMF (dimethylformamide) containing 500 mg. of the product in 10 ml is −4.7° (+0.3°) at 25° C.

The compounds of the present invention are compatible with other therapeutic agents which may be used in connection therewith, such an analgesics, sedatives, tranquillizing agents, antacids and bulky constipants, and may be administered orally, subcutaneously, intravenously or rectally in any of the known pharmaceutical forms generally employed for these modes of administration.

In accordance with the present invention the tropyl tropate derivatives may be associated with a carrier which may be either a solid material or a sterile parenteral liquid. The compositions may be in the form of tablets, capsules, suppositories, vials or other dosage forms. Liquid diluents, such as sterile water, are employed in sterile condition for parenteral use.

Reference will now be made to some specific examples showing compositions which may be prepared and used in accordance with this invention without, however, limiting the same.

Example III

Aqueous solutions for parenteral use may have the following compositions.

(A)

p-Phenylphenacyl-1-hyoscyaminium bromide __mg__ 2
Distilled water q.s. ad _____ml__ 2

The vials were sterilized for 20 minutes at 120° C.

(B)

p-Phenylphenacyl-1-hyoscyaminium bromide __mg__ 10
Distilled water q.s. ad _____ml__ 10

The solution was perfectly stable over the period of observation (4 and 9 months at +45° and +55° C.; 15 months at +37° C.).

(C)

Since product (K) is very slightly soluble in water (0.18%), it is necessary to dissolve it in mixtures of organic solvents and water in order to obtain more concentrated solutions:

| | | |
|---|---|---|
| p-Phenylphenacyl-1-hyoscyaminium bromide | mg | 10 |
| NaCl | mg | 14 |
| Propylene glycol ⎫ 50% v./v. q.s. ad<br>Water for injection ⎭ | ml | 2 |

(D)

An aqueous solution for parenteral use and containing an analgesic had the following composition:

| | | |
|---|---|---|
| p-Phenylphenacyl-1-hyoscyaminium bromide | mg | 2 |
| 1-phenyl-2,3-dimethyl-5 - pyrazolene - 4 - methylamino-methanesulfonate sodium (analgesic) | mg | 1 |
| Sterile water q.s. ad | ml | 2 |

The vials were sterilized for 1 hour at 100° C.

Example IV

Tablets comprising the compounds of the present invention, suitable for oral administration, may have the following compositions:

(A)

| | Mg. |
|---|---|
| p-Phenylphenacyl-1-hyoscyaminium bromide | 2 |
| Kaolin | 83 |
| Starch | 15 |
| Talc | 10 |
| Magnesium stearate | 10 |

The powders were mixed, granulated and tableted by wet-granulation.

(B)

| | Mg. |
|---|---|
| p-Phenylphenacyl-1-hyoscyaminium bromide | 5 |
| Lactose | 54 |
| Starch | 34 |
| Gelatin | 3 |
| Talc | 3 |
| Mg stearate | 1 |

This preparation, made by wet-granulation, showed no deterioration when aged for 6 and 12 months at +37° C. and +45° C.

Example V

Compositions suitable for rectal use had the following composition per suppository

| | | |
|---|---|---|
| p-Phenylphenacyl-1-hyoscyaminium bromide | mg | 3 |
| Triesters of glycerol and fatty acids q.s. ad | g | 2.5 |

These suppositories were stable during 13 months storage at room temperature.

Variations can, of course, be made without departing from the spirit and scope of the invention.

Having thus described our invention, what we desire to secure by Letters Patent and hereby claim is:

1. An antispasmodic and gastric antisecretory therapeutic composition comprising an effective amount of a tropyl tropate derivative of the formula:

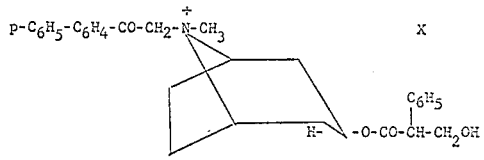

wherein X is a halogen, and a pharmaceutical carrier.

2. The composition of claim 1 wherein X is bromine.

3. The composition of claim 1 wherein the tropyl tropate derivative is p-phenylphenacyl-1-hyoscyaminium bromide.

4. The composition of claim 1 wherein the tropyl tropate derivative is p-phenylphenacyl-d1-trophyltropinium bromide.

5. The composition of claim 1 wherein the tropyl tropate derivative is present in an amount ranging from about 2 to 20 mg.

6. The composition of claim 1 wherein the tropyl-tropate derivative is persent in admixture with an analgesic.

7. The composition of claim 5 wherein the tropyl-tropate derivative is present in admixture with an analgesic.

References Cited

UNITED STATES PATENTS 2,903,394  9/1959  Johnston et al. _____ 260—292

ALBERT T. MEYERS, *Primary Examiner.*

S. FRIEDMAN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,436,458 April 1, 1969

Uberto Teotino

It is certified that error appears in the above identified patent and that said Letters Patent are hereby corrected as shown below:

Column 1, lines 59 and 60, "dimiution" should read -- diminution --. Column 2, line 56, "chloline" should read -- choline --. Columns 3 and 4, TABLE 1, in the sub-heading to the table, line 2, "trols treated" should read -- controls treated --. Column 6, line 44, "(+0.3°)" should read -- (±0.3°) --. Column 8, line 37, "persent" should read -- present --.

Signed and sealed this 7th day of April 1970.

(SEAL)
Attest:

Edward M. Fletcher, Jr.
Attesting Officer

WILLIAM E. SCHUYLER, JR
Commissioner of Patents